Jan. 2, 1934.  J. W. GOTTSCH  1,942,056
HEN'S NEST
Filed Aug. 15, 1927

INVENTOR.
JOHN W. GOTTSCH.
BY A. B. Bowman
ATTORNEY

Patented Jan. 2, 1934

1,942,056

UNITED STATES PATENT OFFICE 1,942,056

HEN'S NEST

John W. Gottsch, Fontana, Calif.

Application August 15, 1927. Serial No. 212,911

5 Claims. (Cl. 119—45)

My invention relates to hens' nests and the objects of my invention are: First, to provide a novel hen's nest structure which may be used individually or which may be economically combined with others to form a battery of nests; second, to provide a hen's nest having a V-shaped bottom which reduces to a minimum the danger of getting the bottom of the nest bare of litter, thereby removing the main cause of cracked eggs, and which, by reason of its peculiar shape, requires considerably less litter; third, to provide a hen's nest which is made in substantially rectangular form but placed on an angle, thereby providing a hen's nest which may be reduced considerably in size and still provide considerably more head room; fourth, to provide a hen's nest of this class which has ample entrance space and still provides considerably for secrecy, thus facilitating the desire to lay eggs; fifth, to provide a nest of this class which, by reason of the small size of the individual nest and by reason of its sloping sides greatly reduces the crowding of hens, thereby removing another cause of cracked eggs; sixth, to provide a novel gate construction for hen's nests of this class and novel means for holding the same in position, whereby the gate may be easily removed by raising the same a slight distance only, and whereby the gate may be removed or inserted in position without the danger of jamming; seventh, to provide a hen's nest of this class which may be readily and thoroughly cleaned and kept clean; eighth, to provide a novel plate which may be used alike for closing the rear of the nest and also as a gate or door; ninth, to provide a hen's nest which requires no doors to open or close, thus providing great saving in time and labor in collecting eggs; tenth, to provide a nest of this class which is well ventilated; eleventh, to provide a hen's nest section which may be combined in any desired form to suit any vacant space in the poultry house, and which is self contained and portable and has no hidden corners or cracks to encourage the breeding of vermin; twelfth, to provide a novel means in connection with a hen's nest for roosting and means to facilitate the entrance and exit of the hens to and from the nests; thirteenth, to provide novel means at the top of the top nest to prevent a hen from roosting thereon, and fourteenth, to provide a nest of this class which is particularly simple and economical of construction, durable, and which will not readily deteriorate.

Figures 1, 2:
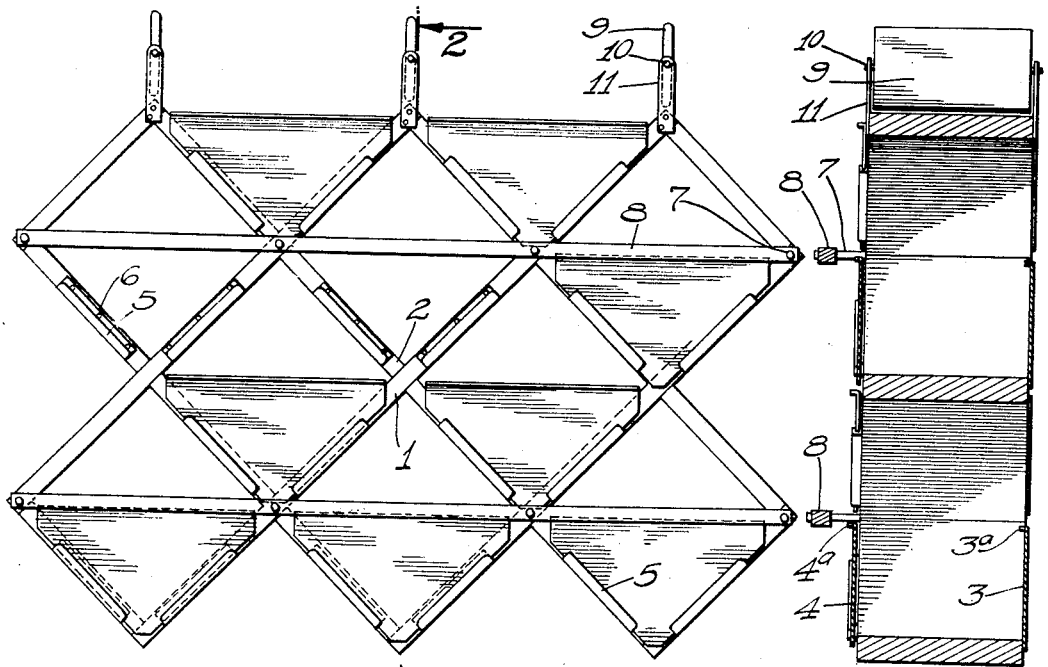
Figure 5:
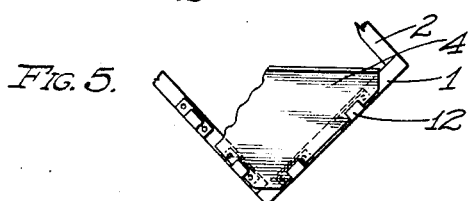
Figure 4:
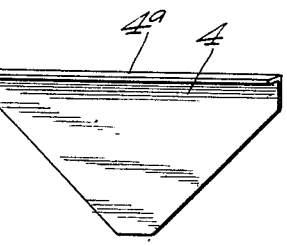
Figure 3:
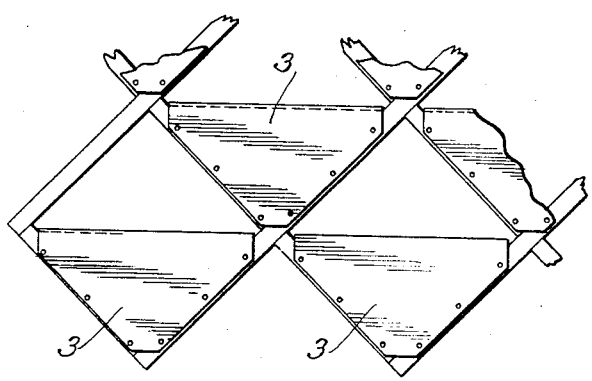

With these and other objects in view as will appear hereinafter my invention consists of certain novel features of construction, combination and arrangement of parts and portions as will be hereinafter described in detail and particularly set forth in the appended claims, reference being had to the accompanying drawing and to the characters of reference thereon which form a part of this application, in which Figure 1 is a front elevational view of my hen's nest in one form of construction, certain of the gates thereof being shown removed to facilitate the illustration; Fig. 2 is a sectional elevational view thereof taken through 2—2 of Fig. 1; Fig. 3 is a fragmentary rear elevational view thereof, and Fig. 4 is a perspective view of one of the gates which is also used as a rear wall member, and Fig. 5 is a fragmentary front elevational view thereof showing a slightly modified means for supporting the removable front gates.

Like characters of reference refer to similar parts and portions throughout the several views of the drawing.

My hens' nests, when made in a battery, are made preferably of long and wide boards 1, which extend diagonally across the unit at an angle of forty-five degrees and in spaced relation to each other, and are secured together and in such spaced relation by short wide boards 2, the width of the boards being preferably the depth of the nests from front to rear. The individual nests are preferably made rectangular or rhomboidal in cross sections but tilted so that the two bottom sides as well as the two top sides are all preferably at an angle of forty-five degrees with the horizontal. The several nests are so arranged that, as a unit, they are self-supporting, that is, the lower nests all resting on the ground or any other suitable support at their lower edges. The several nests are also so arranged in a unit to form, as a whole, a rectangular outline so as to suit a rectangular space if desired.

Over the rear end of each of the several nests forming rectangular or rhomboidal spaces, is secured a right triangular sheet metal piece 3, the right angle portions thereof fitting over the lower rear corners of the nests. These plates 3 cover only the lower portions of the inner ends and extend preferably with their upper edges slightly below the horizontal center line. The upper edges of these plates are bent inwardly forming ledges 3a which rest at their ends on the lower adjacent or bottom forming members of the nests, as shown in Fig. 2. The ledges 3a also prevent the hens, to a large degree, from scratching the litter out of the nests.

The gates 4, above referred to, are identical in construction with the plates 3 and are removably positioned over the lower portions of the opposite or front ends of these nests. These gates 4 are retained in position by retaining and guide members 5 which are secured to the front edges of the boards and at a slight distance upwardly from the lower corners of these nests, as shown. These members 5 are made of sheet metal bent in substantially U-shape with the inner or securing leg portions thereof slightly longer than the outer leg or flange portion. The inner leg portions of the retaining and guide members 5 are secured to the boards by nails or other suitable means 6 as shown in Fig. 1. The short edges of the gates 4 are supported within these members and are held in fixed position therein. The gates, however, may be readily removed by raising the same only a slight distance. The positioning and removal of the gates is facilitated by flanges 4a at the upper edges thereof, which extend outwardly, as shown, and which correspond with the flanges 3a of the plates 3.

In Fig. 5 of the drawing, I have shown the gate retaining and guiding means at each side as constructed of two members 12, which are relatively short but also bent in U-shaped form with the inner or securing leg considerably longer and wider than the front leg so as to provide suitable means for securing the members 12 in position. The shorter U-shaped members 12 provide less opportunity for sand, dirt or other particles to be wedged therein than in the longer U-shaped retaining and guide members 6.

The nests are preferably made from boards surfaced on one side, such surfaced sides being placed downwardly providing a smooth surface for the combs of the hens. The rough sides provide at the top sides of the bottom of the nests greater resistance to the scratching of the litter from the nests.

At the front of the nest units are provided roosts or means to facilitate the entrance and exit to and from the nests. This means consists preferably of iron rod or pipe sections 7, which are inserted into holes in the front edges of the boards, and poles 8 which are removably positioned over the extended ends of the rods or pipe sections 7, as shown. These roosts or means are arranged horizontally at the alternately vertical nests, preferably at the intersections of the boards, so that one pole or roost may be used for two horizontal rows of vertically spaced nests.

In order to reduce to a minimum the desire of hens to roost at the upper edges or corners of the nests I have provided a tilting means immediately above the same, which means consists of flat members or boards 9 having pins 10 at their opposite ends and pivotally mounted by means of said pins in brackets or supports 11 extending upwardly from said corners at the edges of the boards. The pins 10 are positioned at one side of the longitudinal centers of the boards or tilting members 9 so that the same automatically extend in a vertical direction. When a hen attempts to roost on the upper edges of the members 9, the same tilt, forcing the hen to seek another place for roosting.

Having thus described my invention, what I claim as new and desire to secure by Letters Patent is:

1. A hen's nest having a V-shaped bottom, a triangular plate positioned over the lower portion of the rear end of the nest, and a similar plate removably positioned over the lower portion of the front end of the nest and the upper portion of both ends being open.

2. A hen's nest having a V-shaped bottom, a triangular plate positioned over the lower portion of the rear end of the nest, and a similar plate removably positioned over the lower portion of the front end of the nest, the upper edge of the first plate having an inwardly extending flange and the upper edge of the second plate having an outwardly extending flange.

3. A hen's nest structure comprising a plurality of closely positioned hen's nests, each nest being of substantially rectangular cross section from front to rear with the sides thereof inclined to the horizontal plane, the walls forming the bottom of each nest forming also the top walls of nests positioned below and to the sides, and the inclined upper walls of each nest forming also the bottom walls of the adjacently positioned nests positioned above and to the sides.

4. In a hen's nest structure, a plurality of superimposed horizontal rows of individual hens' nests, and roosts mounts in front of said nests, one roost serving as entrance means for two superimposed horizontal rows of nests.

5. A hen's nest structure comprising a plurality of tiers of hens' nests, those in one tier being positioned in staggered relation to those in the adjacent tier, said nests having bottom portions with inclined sides, the inclined sides forming portions of the top portions of two adjacent nests in the next lower tier.

JOHN W. GOTTSCH.